July 23, 1940.　　W. VAN B. ROBERTS　　2,208,733
DIRECTIVE SIGNALING
Filed May 6, 1937　　3 Sheets-Sheet 2

INVENTOR
W. VAN B. ROBERTS
BY
ATTORNEY

Patented July 23, 1940

2,208,733

UNITED STATES PATENT OFFICE 2,208,733

DIRECTIVE SIGNALING

Walter van B. Roberts, Princeton, N. J., assignor to Radio Corporation of America, a corporation of Delaware Application May 6, 1937, Serial No. 141,025

18 Claims. (Cl. 250—11)

This application concerns a new and improved direction finder suitable for aircraft which direction finder indicates the direction of a transmitting station both as to horizontal and vertical angle with respect to the axis of the ship.

An object of the present invention is to provide a direction finder as described above giving visual indication of direction.

Figure 1:
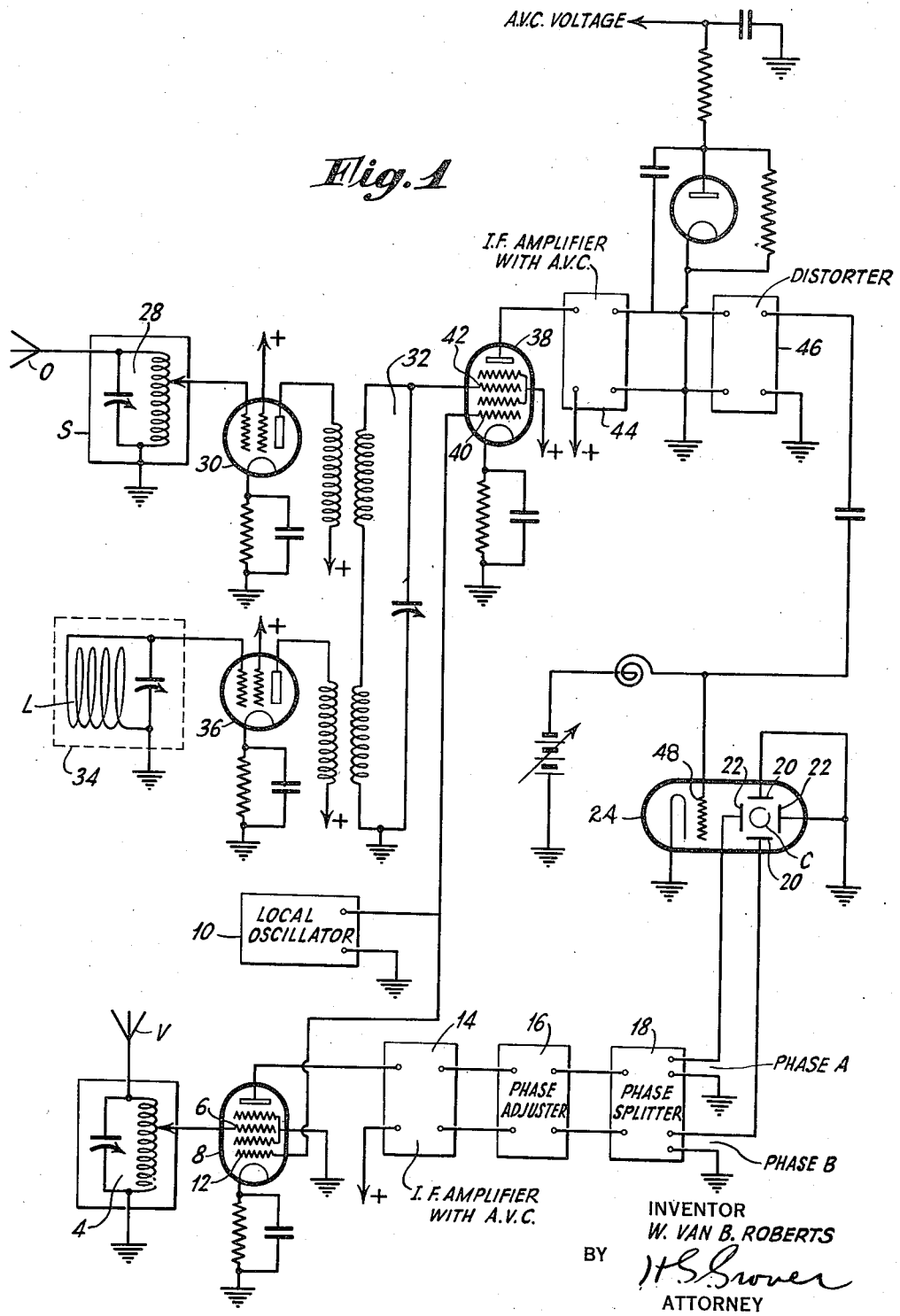
Figure 2:
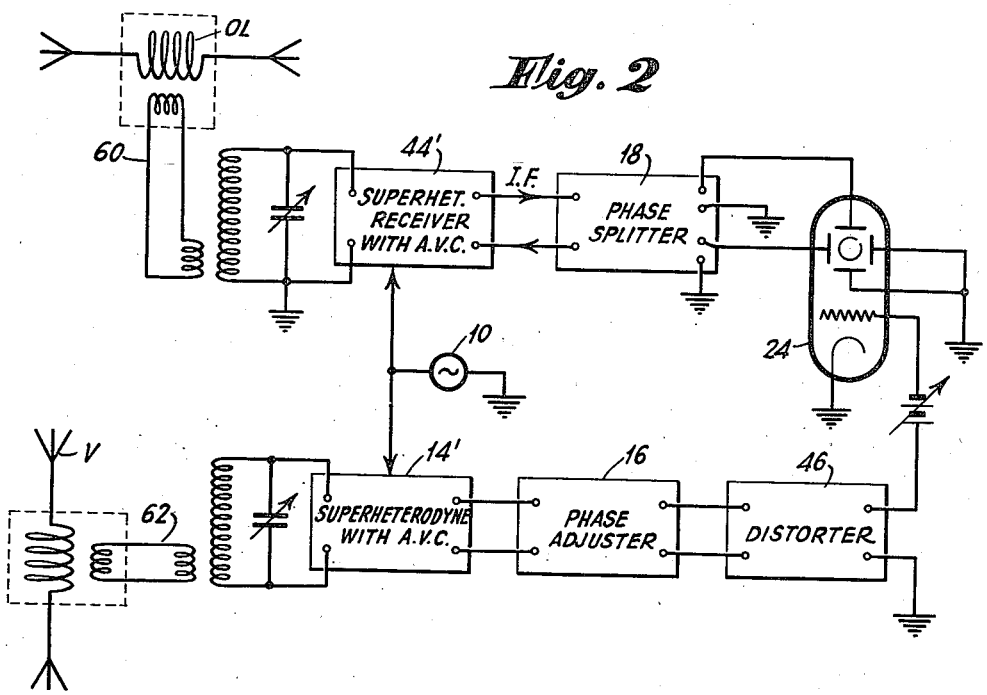
Figure 3:
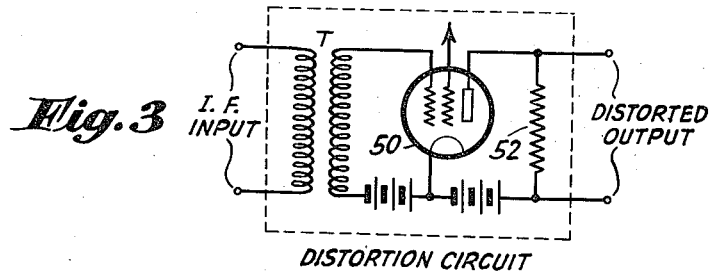
Figure 4:
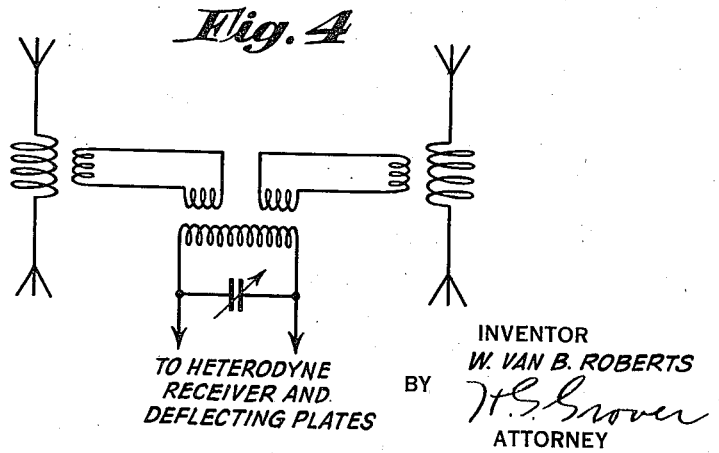

In describing my invention reference will be made to the attached drawings wherein Figures 1, 2, 5, and 6 illustrate the essential elements of four modifications of my novel directive signaling system;

Figure 3 illustrates a circuit for producing distorted voltages which are used in the circuits of Figures 1, 2, 5, and 6, while Figure 4 illustrates a modified form of directive pickup device which may replace the directive antennae of Figures 1, 2, 5, and 6.

Referring to Figure 1 a non-directional antenna V, tuned by a circuit 4, receives signals from a ground station and feeds them to a control electrode 6 of a tube 8 which also is excited by oscillations from a source 10 connected with control electrode 12. In this way, the signals are converted to an intermediate frequency which is amplified in the intermediate frequency amplifier 14, the amplification of which is controlled in accordance with signal strength in known fashion. The intermediate frequency output from 14 is passed through a phase adjusting network 16 of any type such as for example as disclosed in my copending application Serial #69,105 filed March 16, 1936 and then impressed upon a phase splitting network 18. This phase splitting network may consist, in accordance with the known art, of a pair of loosely coupled tuned circuits since it is known that the phase of the voltage across the secondary tuned circuit in such a case is 90° different from the phase of the voltage across the primary tuned circuit. By means of suitable taps on these two circuits, voltages of equal magnitudes but 90° different in phase, are obtained. These voltages are impressed upon the pairs of deflection plates 20 and 22 of a cathode ray oscilloscope 24 and produce a circular pattern on the screen or target thereof as is well known. The diameter of this circle C will depend upon signal strength but if the automatic volume control mentioned above is made sufficiently "stiff" the diameter of the circle on the target will not vary greatly over a substantial range of signal strengths.

O is an open antenna arranged substantially parallel to the direction of motion of the aircraft, the positioning of this antenna being adjusted once for all so that it picks up no signal when the aircraft is travelling in a plane perpendicular to the electric field. If the aircraft is several wavelengths above the earth, the electric field due to a vertical open oscillator at a ground station, will lie in a vertical plane and will be perpendicular to the line joining the aircraft with the transmitting antenna. Hence, the voltage picked up by antenna O will be proportional to the sine of the angle by which the line of flight deviates from the line to the transmitter in the vertical plane provided the ship is flying straight toward the transmitter as far as its horizontal direction is concerned.

The antenna O is tuned by a circuit 28 in a shield S and feeds voltage to 30 and from 30 to the tuned circuit 32 where it is combined with voltage derived from loop L.

The loop antenna L is arranged to avoid electrostatic pickup, as for example, in an electrostatic shield 34 with its axis parallel to the line of flight so that the voltage pickup by the loop is proportional to the sine of the horizontal angle between the line of flight and the direction to the transmitter. The voltage induced in the loop L, however, is 90° different in time phase from the voltage picked up by open antenna O so that the vector sum of the two voltages picked up by the two directional antennas L and O will have its magnitude substantially proportional to the sine of the deviation between the line of flight and the direction of the transmitter (provided this angle is small) while its phase varies continuously in accordance with the position angle of the deviation. That is to say, if the ship is headed above the transmitter the sum of the two antenna voltages will have a certain phase, if the ship is headed to the left of the transmitter the phase will be 90° different, if it is headed directly below the transmitter the phase is further shifted another 90° and if it is headed to the right of the transmitter the phase differs by still another 90°, while at intermediate position angles the phase passes through intermediate values. The voltages picked up by L are amplified in 36 and impressed on the combining circuit 32 and from 32 on the tube 38. In the embodiment shown in Figure 1 the two directional antenna voltages are not combined directly but are separately impressed upon the tubes 30 and 36 whose outputs are combined in a single tuned circuit 32 in which the resultant voltage has a magnitude determined by the absolute deviation of the line of flight from the line to the transmitter while its phase depends upon the position angle of this deviation, as explained above. This resultant voltage is then combined with the same local oscillations from 10 as were utilized for producing intermediate frequency from the non-directional signals picked up by V so that exactly the same intermediate frequency is produced from the directional antenna voltages. In Figure 1 oscillations from 10 are fed to grid 40 of tube 38 and mixed with voltage fed from 32 to grid 42 of tube 38. The resulting intermediate frequency oscillations are fed to intermediate frequency amplifier 44. This intermediate frequency is amplified in 44 by an amplifier having automatic volume control and then passed through a wave distorting means 46 which produces a greatly exaggerated response at the peak of one-half wave of each cycle. This momentary impulse is impressed upon the intensity control, for example, the grid 48 of the oscilloscope tube 24 so as to momentarily alter the intensity of the bright spot tracing the circle upon the screen, as before described and as indicated by the break in circle C. In the drawings it is assumed that this impulse substantially eliminates the spot or cathode ray at the moment of the impulse so that the circle will appear to have a break at some point in it. If the impulse is applied to an electrode of the tube which controls the deflection sensitivity of the tube the circle will have a dent or a projection at the point where the spot is located at the time of the impulse, while if the impulse is impressed upon an electrode controlling focussing of the ray, then the circle will have a broadened spot at one point. It is immaterial how the circle be effected so long as there is a good visual indication of the effect. Remembering now that the phase of the resultant voltage from the two directional antennas depends upon the position angle deviation of the line of flight from the line to the transmitter, it will be seen that the break or other indication on the circular trace will lie in a part of the circle determined by this position angle. The purpose of the phase adjuster 16 which may follow either of the intermediate frequency amplifiers, is to adjust the relative phase of the directional and distorted impulse compared to the phase of the non-directional voltage so that the break or other indication on the circular trace will occur at a position having a visual correspondence to the position angle of the ship's deviation. Preferably the phase will be so adjusted that if the transmitter lies to the right of the line of flight the break will lie at the right hand side of the circle while on the other hand, it will be located at the left hand side of the circle when the transmitter is to the left of the line of flight. Similarly, the break will be at the top or the bottom of the circle if the line to the transmitter is above or below the line of flight, while for deviations which are partly horizontal and partly vertical, the break will always have the same clock position as the transmitter when viewed from the aircraft. In order to obtain this result the relative polarity of the voltages producing the circle must be correct. In order to approach directly toward the transmitter the pilot then merely steers the ship so as to cause the resultant voltage from the directional antennas to disappear, thus leaving the circle complete and without any distinguishing characteristic at any point. In addition to providing a criterion of the desired line of flight and a means for indicating in both horizontal and vertical directions any deviations therefrom, the oscillograph pattern also indicates qualitatively the amount of any such deviations by the intensity of the characteristic change of the circle while the size of the circle itself qualitatively indicates the strength of the signals and hence the proximity to the transmitter.

Figure 3 shows a means for obtaining a distorted output such as has been assumed in the foregoing description. In Figure 3 intermediate frequency voltage is impressed by T on the input electrodes of a vacuum tube 50 so biased that only at the positive peak of the impressed voltage wave does any current flow through the plate circuit resistance 52. Thus, there is no voltage across the distorter output except at approximately the moment of the positive peak of the input wave and this voltage being negative, will result when impressed upon the intensity of the control grid 48 in Figure 1, in cutting out a small segment of the circular trace.

Figure 2 shows a modification of the invention wherein a single antenna structure OL is employed for picking up the two out of phase directional voltages. This antenna structure comprises a loop antenna having its axis along the line of flight and having its terminals connected to projecting linear portions also directed along the line of flight, the dimensions of the loop and the dimensions of the linear portions being so chosen that the system is preferably nearly resonant to the frequency of the signals. Also, the dimensions are so chosen that the voltage picked up by the open portion for a given vertical deviation is the same as the voltage picked up by the loop portion for the same horizontal deviation except for the fact that these two voltages are 90° different in phase. This phase relation is independent of tuning. A link circuit 60 may be employed for coupling this antenna system to a tuned circuit and the result is that the voltage across the tuned circuit has a phase and magnitude determined exactly as was the case in Figure 1 with respect to the voltage across the tuned input circuit 32 of the frequency changing tube 38. In Figure 2 there is also provided a non-directional antenna V which may be an open antenna link-coupled at 62 to a tuned circuit. The essential difference between Figure 2 and Figure 1 is that in Figure 2 the resultant directional voltage after being changed to intermediate frequency in 44' has its phase split and produces a circular pattern on the oscilloscope, the size of this circle depending upon the deviation between the line of flight and the direction to the transmitter so that when the ship is flying straight toward the transmitter, the circle degenerates into a single spot at the center of the target. The non-directional voltage, after being converted to intermediate frequency in 14' and amplified, has its phase adjusted in 16 as before described and is then passed through a distorting means 46 and impressed upon an element of the oscilloscope which affects the spot of light as to brightness or focus or affects the deflection sensitivity of the oscilloscope as before explained. The only difference between Figure 1 and Figure 2 from the point of view of the pilot is that in Figure 1 the circle remains of a size determined only by the signal strength while in Figure 2 the size of the circle is determined only by the deviation of the plane from the path. In both cases, however, the clock position or position angle of the deviation is indicated by the location of the characteristic spot on the circle.

While a loop antenna has been shown in both Figure 1 and Figure 2 as a means for picking up a voltage proportional to horizontal deviation, it is equally possible to use any other antenna arrangement for obtaining such a voltage provided that such voltage will be 90° out of phase with respect to the voltage picked up by the other directional antenna which is responsive only to vertical deviation. Figure 4 shows a pair of open vertical antennas located on a horizontal line perpendicular to the axis of the plane and link coupled for example to a common tuned circuit in which their effects oppose so that when the ship is flying straight towards or over the transmitter there will be no resultant voltage while there will be a phase difference between the two voltages picked up when the ship is flying at a horizontal deviation, with the result that the combined voltage will be 90° different from the open antenna voltages and proportional to the sine of the angle of horizontal deviation. Thus, Figure 4 has the same characteristics as, and can be used instead of, the loop in either Figure 1 or Figure 2.

It will be found that in case the ship is flying away from the transmitter instead of toward it, an attempt by the pilot to correct his course in accordance with the above explanation will result in making the deviation greater instead of less. This tells the pilot that he is flying away from instead of toward the transmitter and provides a sense reading as well as a line direction reading.

Figure 5:
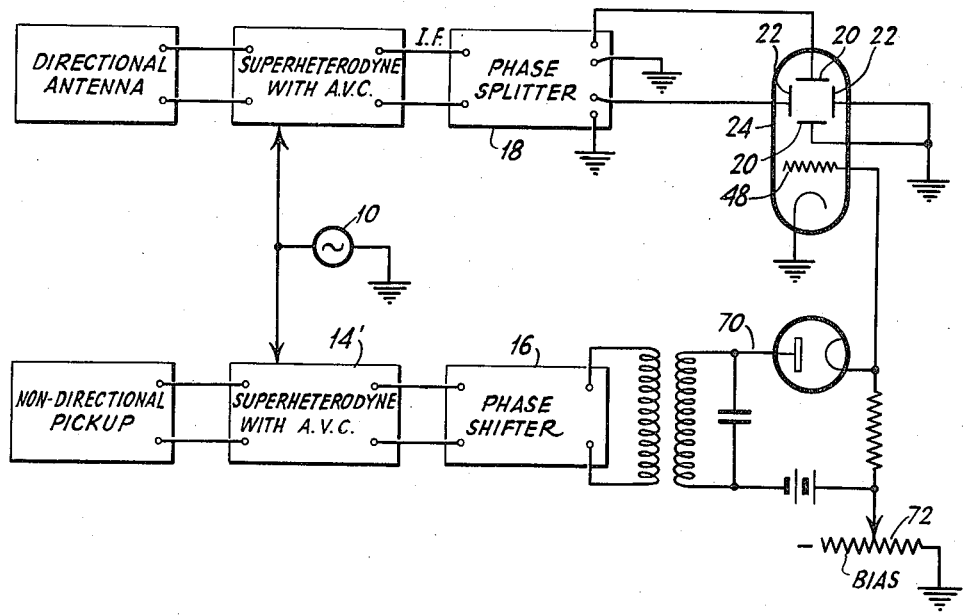

A modification of Figure 2 is shown in Figure 5. Here the directional antenna voltage obtained by direction pickup devices having the characteristics of O and L of Figure 1 or OL of Figure 2, is used to produce the circular trace on the oscilloscope screen and the non-directional voltage acts upon a biased diode 70 to produce a single positive pulse per cycle which is impressed on the control grid 68 of the oscilloscope in series with its biased supply 72. The latter is adjusted so that only during this positive pulse does the spot become visible. Thus, in case the plane deviates from its course toward the transmitter the oscilloscope screen will show only a short segment or arc of a circle. The radius of this arc is an indication of the amount of deviation while its position indicates the direction of deviation, it being assumed that the direction of rotation of the spot and the relative phases of the two intermediate frequency currents has been adjusted as explained before so as to make the arc appear at a "clock position" on the screen or target corresponding to the position of the ground station as viewed from the plane. In case the plane is on its course the arc will of course shrink down to a mere spot at the center of the screen but this spot will not destroy the screen material since it is only actually present during the small part of each cycle when the positive pulse from the diode 70 removes the excess bias from the grid 68. This average intensity may be adjusted by adjusting the grid bias supplied by 72.

Figure 6:
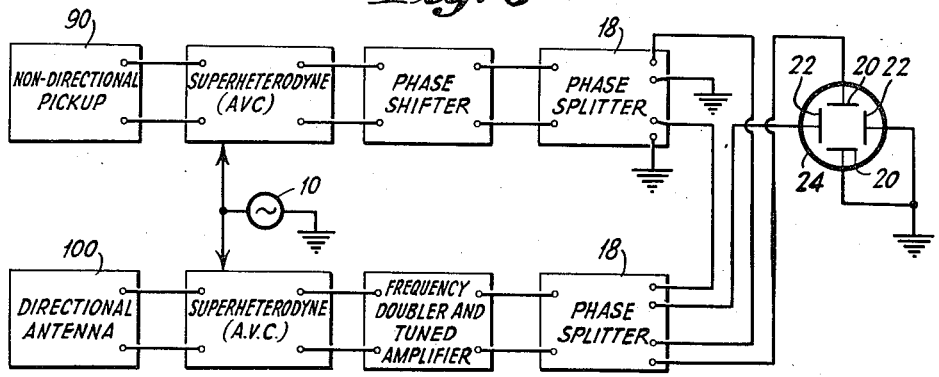

Still another modification of the invention is shown in Figure 6. In this case the plates 20 and 22 are supplied not only with the circle producing voltages derived from the non-directional antenna 90 but also with double frequency voltages derived from the directional antenna 100 when the plane is off course. These double frequency voltages are also arranged so that by themselves they produce a circular trace on the target which, preferably, rotates in an opposite direction relative to the circle produced by the other voltages, i. e., from the non-directional antenna. The resultant trace on the screen has a single maximum radius vector which lies in a direction that can be made to coincide with the direction of deviation in the manner explained previously. In case the plane is on course the trace becomes a circle. The directional antenna 100 has the characteristics of the antennae O and L of Figure 1 or OL of Figure 2.

It will be of course understood that in both Figures 5 and 6, useful indications may be obtained with the roles of the directional and non-directional voltages interchanged as noted in connection with Figures 1 and 5, but Figures 5 and 6 show the preferred arrangements.

Although I have described my novel system as a means for determining the direction of a ground station relative to a mobile craft, it is equally applicable to use at a ground station to determine the location of a transmitter on a mobile craft.

I claim:

1. In a directional signaling system, a directional antenna portion which picks up voltage characteristic of its horizontal deviation from a line between it and a source of wave energy, another directional antenna portion which picks up voltage characteristic of its vertical deviation from a line between it and said source of wave energy, a non-directional antenna portion, a cathode ray oscilloscope having ray control elements including deflecting means, connections for applying to said deflecting means high frequency energy derived from at least one antenna portion to move the cathode spot at high frequency to form a pattern and connections for applying the high frequency energy derived from the remainder of said antenna portions to a ray control element of said oscilloscope to modify said pattern at high frequency whereby to produce a discontinuity in said pattern, which discontinuity is characteristic of the deviation from said line.

2. In a directional signaling system, a directional antenna system having a portion for picking up voltage determined by horizontal deviation between a line fixed by the antenna system and the direction of a transmitting station as viewed from the antenna system, and another portion picking up a voltage determined by vertical deviation between a line fixed by the antenna system and the direction of a transmitting station as viewed from the antenna system, a cathode ray oscilloscope having ray control elements including deflecting means, connections for applying to said deflecting means high frequency energy derived from said directional antenna system to move the cathode spot at high frequency to form a pattern, a non-directional antenna and connections from said non-directional antenna for applying energy derived from said non-directional antenna to a ray control element of said oscilloscope to modify said pattern at high frequency whereby to produce a discontinuity in said pattern, which discontinuity is characteristic of the deviation from said line.

3. In a directional receiver, an energy pick-up member directionally responsive to one component of radiated wave energy, a second pick-up member directionally responsive to a different component of said radiated wave energy, means coupled to said members for combining the voltages picked up thereby, a non-directional aerial, a cathode ray tube having a controlling electrode and pairs of deflecting plates, a circuit connected with said non-directional aerial, a circuit connected to said means, and a connection between one of said circuits and said deflecting plates and between the other of said circuits and said controlling electrode.

4. In a directional signaling system, a directional antenna responsive to one component of radiated wave energy, a second directional antenna responsive to a different component of radiated wave energy, means coupled to said antennae for combining the voltages picked up thereby, a non-directional aerial, a cathode ray tube having a controlling electrode and pairs of deflecting plates, a circuit connected with said non-directional aerial, a circuit connected to said means, and a connection between one of said circuits and said deflecting plates and between the other of said circuits and said controlling electrode.

5. A system as recited in claim 4 including a voltage distorting means in one of said connections.

6. In a directional signaling system, a directional antenna responsive to one component of radiated wave energy, a second directional antenna responsive to a different component of said radiated wave energy, means coupled to said antennae for combining the voltages picked up thereby, a non-directional antenna, a cathode ray tube having a controlling electrode and pairs of deflecting plates, an output for said means, an output for said non-directional aerial, a superheterodyne receiver coupling one of said outputs to said deflecting plates, and a superheterodyne receiver coupling the other of said outputs to said controlling electrode, said superheterodyne receivers having a common source of oscillations for heterodyning purposes.

7. In a directional signaling system, a directional antenna responsive to one component of radiated wave energy, a second directional antenna responsive to a different component of said radiated wave energy, means coupled to said antennae for combining the voltages picked up thereby, a non-directional antenna, a cathode ray tube having a controlling electrode and pairs of deflecting plates, an output for said means, an output for said non-directional aerial, a superheterodyne receiver coupling one of said outputs to said deflecting plates, a superheterodyne receiver coupling the other of said outputs to said controlling electrode, and a voltage distorting circuit in one of said couplings.

8. In a directional signaling system, a directional antenna responsive to one component of radiated wave energy, a second directional antenna responsive to a different component of radiated wave energy, means coupled to said antennae for combining the voltages picked up thereby, a non-directional antenna, a cathode ray tube having a controlling electrode and pairs of deflecting plates, output circuits coupled to said means and to said non-directional antenna, a superheterodyne receiver coupled to one of said output circuits, a superheterodyne receiver coupled to the other of said output circuits, means coupling one of said superheterodyne receivers to the controlling electrode in said tube, a phase splitter coupling the other of said superheterodyne receivers to the deflecting plates in said tube, a phase shifter in one of said couplings, and a distorting circuit in one of said couplings.

9. In a directional signaling system, a directional antenna responsive to one component of radiated wave energy, a second directional antenna responsive to a different component of radiated wave energy, means coupled to said antennae for combining the voltages picked up thereby, a non-directional antenna, a cathode ray tube having a controlling electrode and pairs of deflecting plates, output circuits coupled to said means and to said non-directional antenna, a superheterodyne receiver coupled to one of said output circuits, a superheterodyne receiver coupled to the other of said output circuits, said superheterodyne receivers having a common source of oscillations for heterodyning the received voltages to intermediate frequency voltages, means coupling one of said superheterodyne receivers to the controlling electrode in said tube, a phase splitter coupling the other of said superheterodyne receivers to the deflecting plates in said tube, a phase shifter in one of said couplings and a distorting circuit in one of said couplings.

10. In a directional signaling system, a compound antenna comprising a portion responsive to one component of radiated wave energy and a portion responsive to another component of radiated wave energy, a non-directional antenna, a cathode ray tube having pairs of deflecting plates, two heterodyne receivers for heterodyning the voltages picked up by said aerial to intermediate frequency, one of said heterodyne receivers having an input coupled to said compound antenna and the other of said heterodyne receivers having an input coupled to the non-directional antenna, and phase splitting circuits connecting the outputs of said heterodyne receivers to different pairs of deflecting plates in said tube.

11. In a directional signaling system, a directional antenna system having a portion for picking up a voltage determined by the horizontal deviation between a line fixed by the antenna system and the direction of a transmitting station as viewed from the antenna system, and another portion for picking up a voltage determined by the vertical deviation between a line fixed by the antenna system and the direction of a transmitting station as viewed from the antenna system, said voltages being substantially 90 degrees out of phase with each other, an indicating device and means for so coupling said indicating device to said antenna system that a single indication is given of the relative magnitude and phase relationship between said voltages and non-directional antenna and means for coupling said non-directional antenna to said indicating device for modifying the indication of said device in accordance with the energy picked up by said non-directional antenna.

12. In a directional signaling system, a directional antenna responsive to one component of radiated wave energy, a second directional antenna responsive to a different component of radiated wave energy, means coupled to said antennae for combining the voltages picked up thereby, a non-directional antenna, a cathode ray tube having a controlling electrode and pairs of deflecting plates, a super-heterodyne receiver coupled to said combining means, a second super-heterodyne receiver coupled to said non-directional antenna, means for coupling one of said super-heterodyne receivers to the controlling electrode in said cathode ray tube, a phase splitter coupling the other of said super-heterodyne receivers to the deflecting plates in said cathode ray tube, a phase shifter in one of said couplings and a distorting circuit in one of said couplings.

13. In a directional signaling system, a directional antenna responsive to one component of radiated wave energy, a second directional antenna responsive to a different component of radiated wave energy, means coupled to said antennae combining the voltages picked up thereby, a non-directional antenna, a cathode ray tube having a controlling electrode and pairs of deflecting plates, a receiver coupled to said combining means, a second receiver coupled to said non-directional antenna, means for coupling one of said receivers to the controlling electrode in said cathode ray tube, a phase splitter coupling the other of said receivers to the deflecting plates in said cathode ray tube, a phase shifter in one of said couplings and a distorting circuit in one of said couplings.

14. In a directional signaling system, a directional antenna system having a portion for picking up a voltage determined by horizontal deviation between a line fixed by the antenna system and the direction of a transmitting station as viewed from the antenna system, and another portion for picking up a voltage determined by vertical deviation between a line fixed by the antenna system and the direction of a transmitting station as viewed from the antenna system, said voltages being of substantially equal magnitude at equal deviations and substantially 90 degrees out of phase with each other, an indicating device and means for so coupling said indicating device to said antenna system that a single indication is given of the relative magnitude and phase relationship between said voltages, a non-directional antenna and means for coupling said non-directional antenna to said indicating device for modifying the indication of said device in accordance with energy picked up by said non-directional antenna.

15. In a directional signaling system, a non-directional antenna system and a directional antenna system having a portion for picking up a voltage determined by the horizontal deviation between a line fixed by the antenna system and the direction of a transmitting station as viewed from the antenna system, and another portion for picking up a voltage determined by the vertical deviation between a line fixed by the antenna system and the direction of a transmitting station as viewed from the antenna system, said voltages being of substantially equal magnitude at equal deviations and substantially 90 degrees out of phase with each other, an indicating instrument, means for applying the voltage picked up by one of said antenna systems to said indicating instrument whereby an indication is given, and means for modifying said indication in accordance with the voltage picked up by the other of said systems.

16. In a directional signaling system, a non-directional antenna system and a directional antenna system having a portion for picking up a voltage determined by the horizontal deviation between a line fixed by the antenna system and the direction of a transmitting station as viewed from the antenna system, and another portion for picking up a voltage determined by the vertical deviation between a line fixed by the antenna system and the direction of a transmitting station as viewed from the antenna system, said voltages being of substantially equal magnitude at equal deviations and substantially 90 degrees out of phase with each other, an indicating instrument, means for applying the voltage picked up by said directional antenna to said indicating instrument whereby an indication is given and means for modifying said indication in accordance with the voltage picked up by said non-directional antenna system.

17. In a directional signaling system, a non-directional antenna system and a directional antenna system having a portion for picking up a voltage determined by the horizontal deviation between a line fixed by the antenna system and the direction of a transmitting station as viewed from the antenna system, and another portion for picking up a voltage determined by the vertical deviation between a line fixed by the antenna system and the direction of a transmitting station as viewed from the antenna system, said voltages being of substantially equal magnitude at equal deviations and substantially 90 degrees out of phase with each other, an indicating instrument, means for applying the voltage picked up by said non-directional antenna system to said indicating instrument whereby an indication is given, and means for modifying said indication in accordance with the voltage picked up by the said directional antenna system.

18. In a directional signaling system, a directional antenna system having a portion for picking up a voltage determined by the horizontal deviation between a line fixed by the antenna system and the direction of a transmitting station as viewed from the antenna system, and another portion for picking up a voltage determined by the vertical deviation between a line fixed by the antenna system and the direction of a transmitting station as viewed from the antenna system, an indicating device and means for so coupling said indicating device to said antenna system that a single indication is given of the relative magnitude and phase relationship between said voltages, a non-directional antenna and means for coupling said non-directional antenna to said indicating device for modifying the indication of said device in accordance with the energy picked up by said non-directional antenna.

WALTER van B. ROBERTS.